Nov. 7, 1944. E. S. MARIOTTE 2,362,146
WORK HOLDER OR COLLET HOLDING MECHANISM FOR METALWORKING MACHINES
Filed Oct. 7, 1942 3 Sheets-Sheet 1
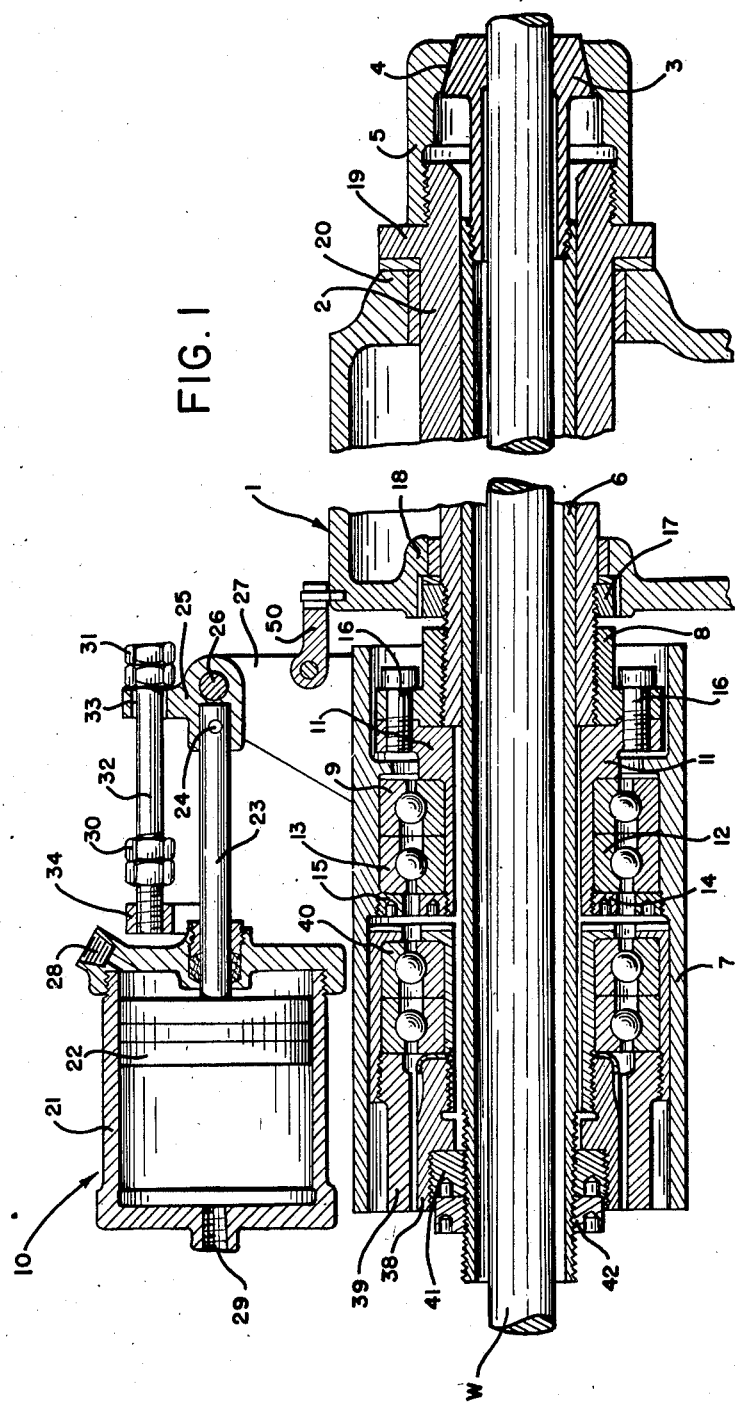
INVENTOR.
EUGENE S. MARIOTTE
BY
Bodell & Thompson
ATTORNEYS Nov. 7, 1944.     E. S. MARIOTTE     2,362,146
WORK HOLDER OR COLLET HOLDING MECHANISM FOR METALWORKING MACHINES
Filed Oct. 7, 1942     3 Sheets-Sheet 2
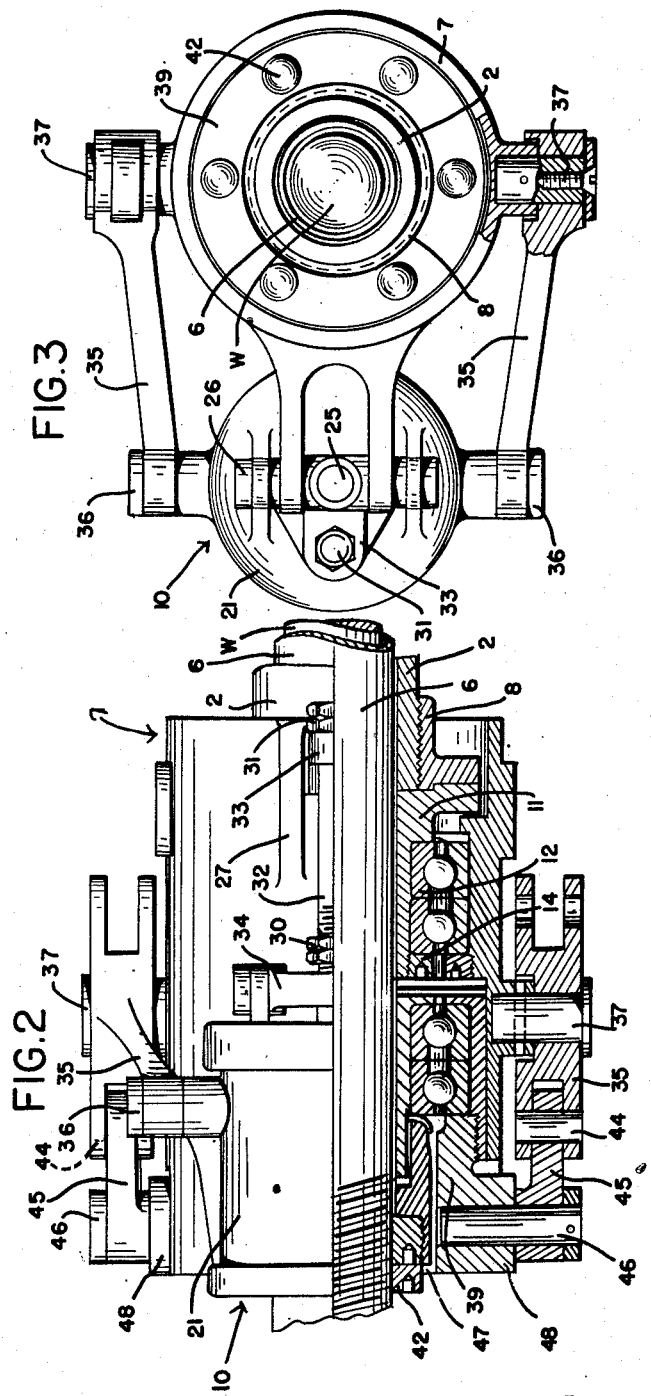
INVENTOR.
EUGENE S. MARIOTTE
BY
ATTORNEYS Nov. 7, 1944.　　E. S. MARIOTTE　　2,362,146
WORK HOLDER OR COLLET HOLDING MECHANISM FOR METALWORKING MACHINES
Filed Oct. 7, 1942　　3 Sheets-Sheet 3
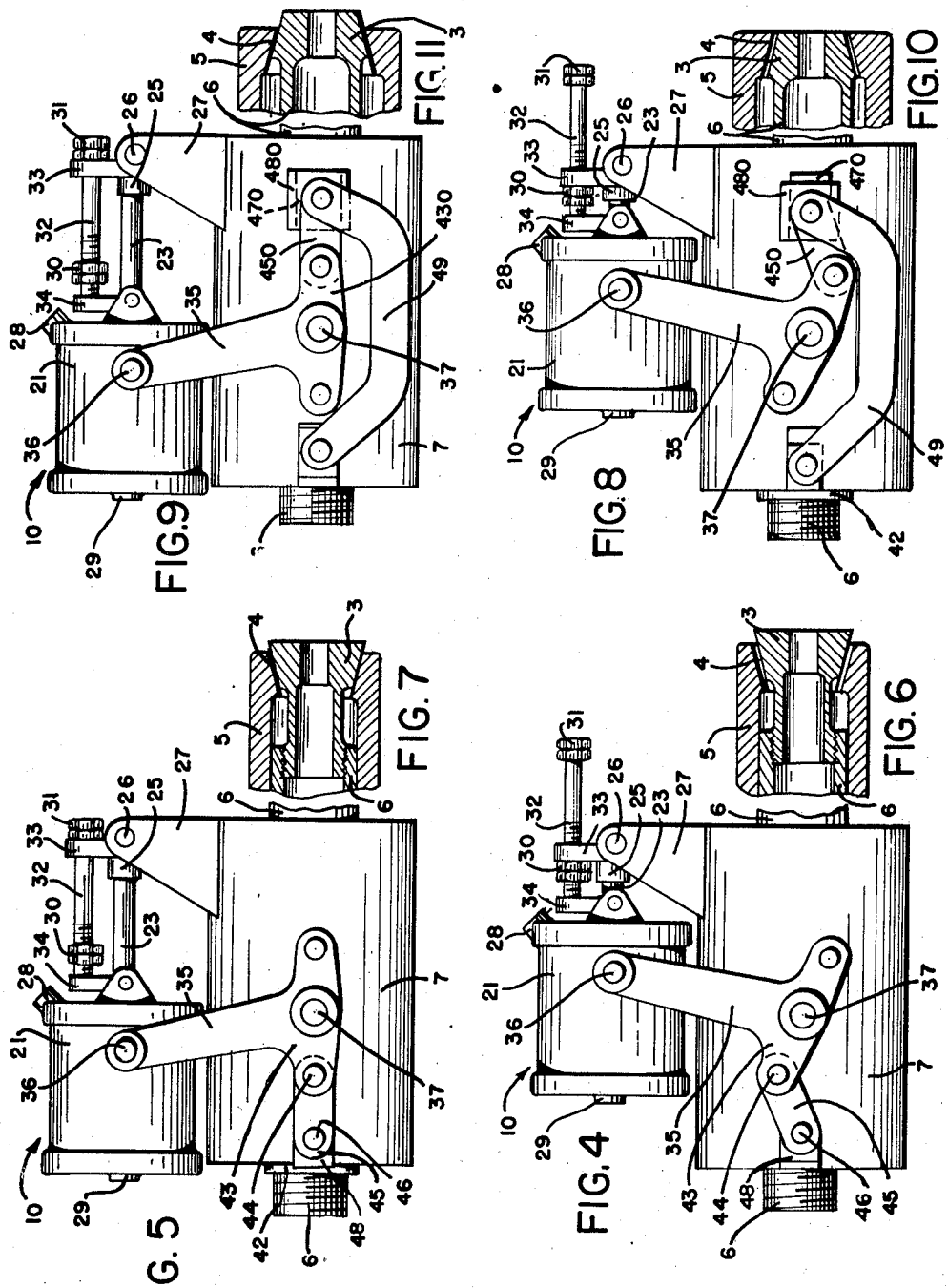
INVENTOR.
EUGENE S. MARIOTTE
Bodell & Thompson
ATTORNEYS Patented Nov. 7, 1944

2,362,146

UNITED STATES PATENT OFFICE 2,362,146

WORK HOLDER OR COLLET HOLDING MECHANISM FOR METALWORKING MACHINES

Eugene S. Mariotte, Syracuse, N. Y., assignor to Lipe-Rollway Corporation, Syracuse, N. Y., a corporation of New York Application October 7, 1942, Serial No. 461,120

1 Claim. (Cl. 279—4)

This invention relates to operating mechanism for the work holding collet or chuck of metal working machines to open the chuck to release the finished work and receive a new work piece and close the chuck on the new work piece, and has for its object a self-contained, compact mechanism including a stationary housing which can be applied as a unit to the machine, as by means of an adapter attachable to the outer end of the hollow rotating spindle of the machine, and actuating means carried as a unit with the non-rotating housing and connected to a reciprocally movable chuck operating member to shift it axially of the spindle, said member extending axially through the hollow spindle to the chuck on the inner end of the spindle and being rotatable with the spindle.

The invention further has for its object a construction in which the stationary housing is mounted on the adapter through a journal bearing, which permits the spindle and the chuck operating member to rotate relatively to the housing, and also a connection between the motor, or other actuator, and the chuck operating member including a sliding journal bearing in the housing between the housing and the chuck operating member.

The invention further has for its object a motion transmitting means between the motor, or other actuator, and the chuck operating member including self-locking parts, which lock the chuck in closed position, and also more specifically such self-locking parts being toggle links.

It has for its object, generally, a self-contained chuck operating mechanism which is particularly simple and compact in construction and readily applied to the machine tool or metal working machine, as by means of an adapter, as compared with the chuck operating means heretofore used consisting of a cylinder with a piston or ram therein, mounted on and concentric with and also rotatable with the spindle of the machine.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of this chuck operating mechanism, the contiguous portion of the head of the metal working machine with the rotating spindle therein, and the collet or chuck.

Figure 2 is a plan view, partly in section, of parts seen in Figure 1.

Figure 3 is an end view, partly in section, looking to the left in Figure 2.

Figures 4 and 5 are side elevations of this chuck operating mechanism showing the position of the motion transmitting means which includes the toggle, between the cylinder of the motor and the chuck operating member in the pull type of chuck operating mechanism, Figure 4 showing the position when the chuck is open, and Figure 5, when the chuck is closed.

Figures 6 and 7 are fragmentary sectional views of the pull type of chuck showing the chuck as open in Figure 6 and closed in Figure 7.

Figures 8, 9, 10 and 11 are views similar to Figures 4, 5, 6 and 7 showing such motion transmitting mechanism in the push type of chuck operating mechanism.

1 designates the head of a metal working machine; 2 the rotating spindle suitably mounted in the head; 3 the chuck or collet carried by the head and having an axial reciprocating movement to open and close it on the work W, the jaws of the chuck being here shown as provided with a peripheral conical surface at 4 coacting with complemental internal conical surface on a cup-shaped head 5, which is secured on the inner end of the spindle in any suitable manner, as by being threaded thereon. 6 designates an axially shiftable chuck operating member extending axially of the spindle 2 and connected to the chuck 3 to shift the same axially to effect the opening and closing thereof. This member is shown as a tube formed with an axial passage for the work piece W, when the work piece is in the form of a bar and fed step by step to the chuck. It will be understood that when the inner end of such bar is finished by the tools of the machine, the finished end is cut off and the bar fed a predetermined distance for the next piece to be finished, these feeding and tooling operations continuing until the bar is used up or is too short, when a new bar is inserted. However, in so far as this invention is concerned, the chuck operating member 6 may be a rod or need not necessarily be a tube.

This invention relates to means for operating or reciprocating the chuck operating member 6. This means includes a non-rotatable housing 7 applied to the outer end of the spindle 2 by means of an adapter 8 and a journal bearing, as an antifriction journal bearing 9, between the adapter and the housing, a motor 10 mounted on the stationary housing at one side thereof and motion transmitting means between the movable motor member and the reciprocating and rotatable chuck operating member 6. The adapter 8 is shown as including an internally threaded collar threading on the outer end of the spindle 2 adjacent the head 1 and a sleeve 11 fixed to the collar and carrying the inner raceways 12 of a double antifriction bearing, the outer raceways 13 of which are held from rotation in the housing 7. The inner raceways 12 are held in position on the sleeve 11 by a nut 14 threading on the sleeve and the outer raceways 13 are secured to the housing by a nut 15 threading in the housing. The sleeve 11 is secured to the adapter collar in any suitable manner, as by screws 16 extending through an annular flange on the adapter collar 8 and threading into a complemental flange on the sleeve 11. The spindle 2 is held from endwise movement by a nut 17 threading thereon and opposed to a shoulder 18 in the head 1 and by an annular flange 19 on the spindle opposed to a shoulder 20 on the housing. Suitable washers are interposed between the nut 17 and the shoulder 18 and between the flange 19 and shoulder 20.

The motor 10 is here illustrated as of the reciprocating or cylinder and piston type, and in the motor here illustrated, the piston is stationary and the cylinder shifts axially. 21 designates the cylinder and 22 the piston therein having its rod 23 fixed to an anchor block 25 pivotally mounted at 26, to have a slight rocking or compensating movement, to a bracket 27 rising from the housing 7. The cylinder 21 has combined intake and exhaust ports 28 and 29 at its opposite ends for a motive fluid, as compressed air, the ports being connected to supply pipes having suitable control valves therein. In so far as this invention is concerned, the valves may be of any suitable construction and may be operated automatically or by hand. The length of the stroke of the cylinder 21, and hence the axial movement of the chuck operating member or tube 6, is controlled by adjustable stops, as nuts 30 and 31, threading on a rod or bolt 32 secured at one end to the cylinder and slidable through a passage 33 in the block 25. The rod 32 is secured to the cylinder through a bracket 34 on the head of the cylinder through which the piston rod 23 works. When the control valve is operated to open the pipe leading to the port 28 to the inlet of air, the cylinder will be moved to the right (Figure 1) until the nuts 30 engage the block 25. When the valve is operated to permit the air to flow through the port 28, it also opens the line to the port 29 to the outlet of air. When the control valve is operated to permit the flow of air through the port 29, the line connecting the port 28 is open to the exhaust of air. When the feed pipe to the port 29 is open for the intake of air, the cylinder 21 is in the position assumed when shifted to the right with adjusting nut 30 against the block 25, and hence the cylinder 21 will then be shifted to the left, until the nut 31 engages the block 25. Shifting of the cylinder 21 to the left shifts the chuck operating member to close the chuck 3 on the work W. Shifting of the cylinder 21 to the right opens the chuck to release the work.

The motion transmitting means between the movable motor member, which, in this embodiment, is the cylinder 21, includes a lever 35 connected to the cylinder and mechanism including self-locking parts between the lever and the chuck operating member. There are two of such levers mounted on opposite sides of the cylinder and the housing. Each lever 35 is mounted at one end on a trunnion 36 on the side of the cylinder 21 and is pivoted at its other end on a trunnion 37 (Figure 3) on the side of the housing 7, the trunnions being located diametrically opposite each other. The mechanism between each lever and the chuck operating member 6 includes an axially slidable element in the housing and links between the lever 35 and said element. The slidable element includes two slides 38, 39. The slide 38 is in the general form of a sleeve connected to the chuck operating tube or member 6. The slide 39 is a sleeve concentric with the slide 38 and mounted to slide in the housing 7 but being nonrotatable. A journal bearing, preferably of the antifriction type, and here shown as a double ball bearing 40, is interposed between the slides 38, 39. The slide 38 is secured to the chuck operating member or tube by an internally and externally threaded ring or nut 41 threading on the outer end of the chuck operating tube 6 and into an internally threaded recess at the outer end of the slide 38. The ring or nut 41 is held in any axially adjusted position by a lock nut 42 threading on the chuck operating member 6 against the ring 41. The slide 39 is held from rotation in the housing 7 in any suitable manner, or as will be hereinafter described.

Each lever 35 is connected to the outer slide 39 through self-locking motion transmitting parts, here shown as constituting a toggle, one link of which is an angular arm 43 on each lever 35 which is pivoted at 44 to one end of a second toggle link 45, the other end of which is pivotally mounted on a trunnion 46 projecting from the outer slide 39 through a slot 47 in the housing to the outside thereof. Preferably, the outer slide 39 is formed with thickened portions or blocks 48 which are guided in the slots 47, and these blocks 48 hold the outer slide 39 from rotation in the housing 7.

The work holding chucks or collets used in metal working machines are of two types, referred to as the "pull" type and the "push" type. The pull type is shown in Figures 6, 7 and operated by mechanism just described, as shown in Figures 2, 4 and 5. In Figures 8, 9, 10 and 11, the push type is shown, and the motion in this type is transferred from the lever through toggle mechanism, similar to that shown in Figures 4 and 5 but arranged to push the chuck operating member to close the chuck instead of pulling it as in Figures 2, 4 and 5.

In Figures 8 and 9, the motion is transferred to the outer slide 39 through an arm 430 on the lever 35 extending in the opposite direction to the arm 43 and connected to a toggle link 450 corresponding to the link 45 in Figures 4 and 5 and the link 450 is pivoted to a slide block 480 working in a slot 470 in the housing 7. The slots 47 and 470 are located toward opposite ends of the housing. The blocks 480 are connected to the blocks 48 by a connecting rod 49. In order that this chuck operating attachment may be applied to machines of the pull or push type, the lever 35 is formed with both arms 43 and 430. If necessary, a suitable connection as a bracket 50 (Figure 1) is made between the housing 7 and the head 1 of the machine to which the chuck operating attachment is applied, in order to offset any tendency of the housing 7 to rotate or be rotated by any friction in the journal bearings.

In operation, the attachment is applied to the head of the metal working machine by threading the adapter 8 on the outer end of a spindle 2 of the machine and also if desired by applying the bracket 50. For a machine having the pull type of chuck, the toggle links 43, 44 are used. For a machine of the push type, the toggle links 430, 450 and connecting rod 49 are used. When the cylinder and piston are in the relative position shown in Figure 1, and the air pressure is through the control valve and port 29, the chuck of the pull type shown in Figures 4 and 5 is closed (Figure 7) and the linkage 43, 45 is in the position shown in Figure 5, with the toggle straightened, and this straightened position is a self-locking position. To open the chuck, the control valve is operated to exhaust the air through the port 29 and permit the air to enter the port 28, thus causing the cylinder 21 to move into the position shown in Figure 4, permitting the chuck to open (Figure 6). It will be understood that the opening and closing movement is a small one. The opening releases the finished work and permits the work bar to be fed axially into the chuck, or a new piece of work inserted, in case the work is not being formed up from bar stock. When the chuck is open, the toggle linkage is in the position shown in Figure 4 with the toggles folded. After the bar has been fed or a new work piece inserted in the chuck, the control valve operated to permit air to enter the cylinder 21 through the port 29 and exhaust through the port 28 causing the cylinder to move to the right and shift the toggle linkage into straightened position shown in Figure 5. The same operation takes place in the push type of chuck (Figures 8 and 9) except that the toggle linkage 430, 450 and connecting rod 49 are used, which have the reverse resultant movement on the chuck operating member or tube 6 from the toggle linkage 43, 45 in Figures 4 and 5.

What I claim is:

In a work holding collet or chuck operating mechanism for metal working machines which include a head, a hollow spindle rotatably mounted in the head, and a chuck carried coaxially with the spindle at one end thereof and having an opening and closing operation; the combination of mechanism for operating the chuck including a stationary non-rotatable housing mounted coaxially with the spindle at the other end thereof, an adapter secured to the other end of the spindle to rotate therewith, a journal bearing between the adapter and the housing, a reciprocating chuck operating member extending coaxially of the housing, the spindle and the adapter and operatively connected to the chuck to open and close the same during the reciprocation of said member, a prime mover carried by the housing and including a reciprocally movable member eccentric to the axis of the chuck, a lever pivotally mounted on the housing and connected to the reciprocating prime mover member, and connections between the lever and the reciprocating chuck operating member including parts movable into a self-locking position when the chuck is closed.

EUGENE S. MARIOTTE.